United States Patent Office 3,454,839
Patented July 8, 1969

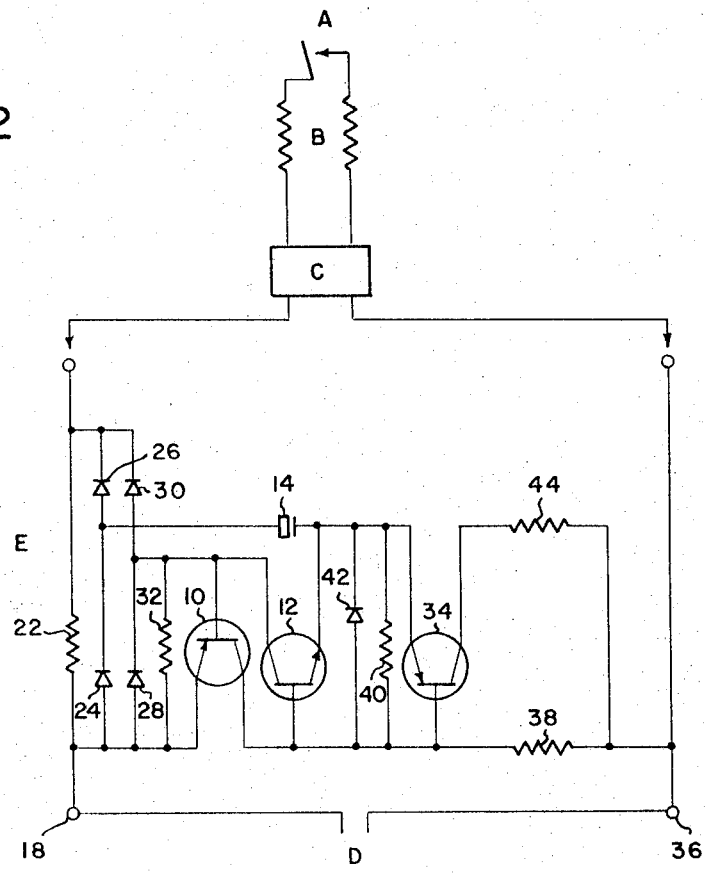
FIG__2
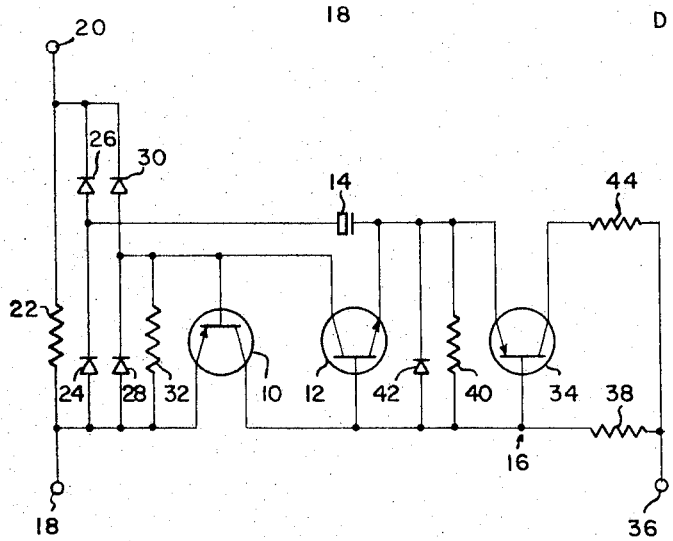
FIG__1
ALEX C. MC INTOSH
INVENTOR.
BY *Seed & Berry*
ATTORNEYS July 8, 1969  A. C. McINTOSH  3,454,839
ELECTRONIC SWITCHING CIRCUIT
Filed March 23, 1966  Sheet 2 of 2
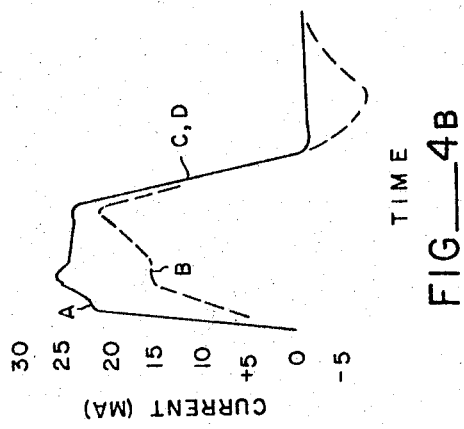
FIG__4A
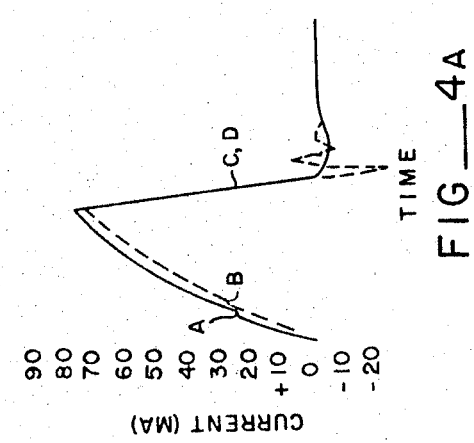
FIG__4B
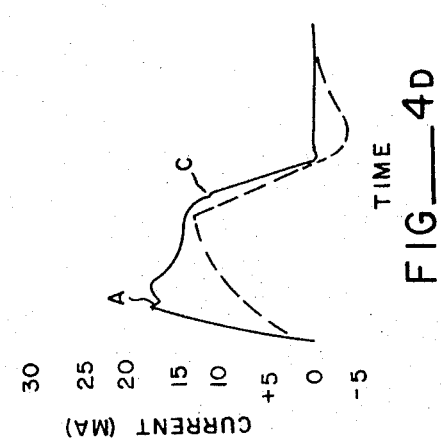
FIG__4C
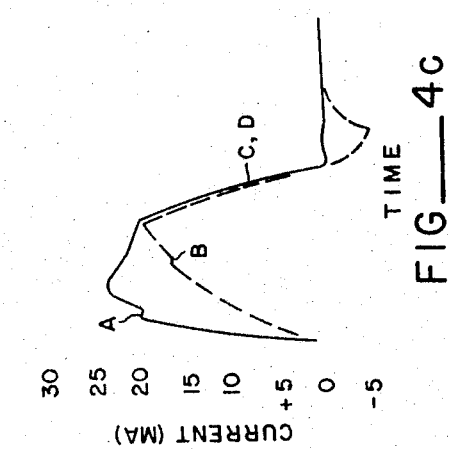
FIG__4D
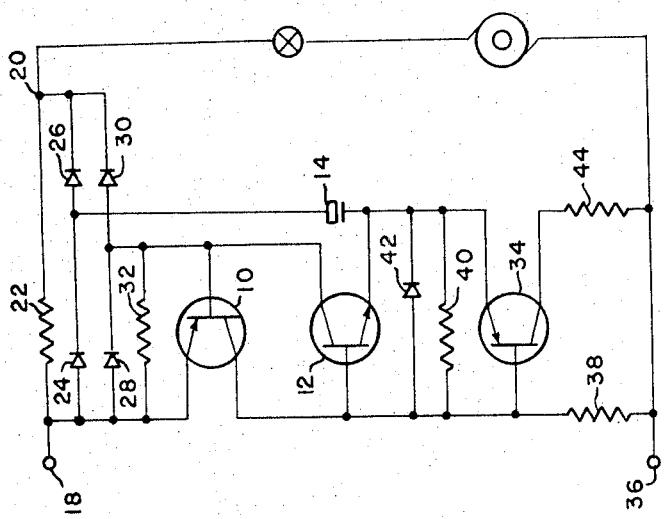
FIG__3
ALEX C. MC INTOSH
INVENTOR.
BY Seed & Berry
ATTORNEYS

3,454,839
ELECTRONIC SWITCHING CIRCUIT
Alex C. McIntosh, 5801 East Drive,
Everett, Wash. 98201
Filed Mar. 23, 1966, Ser. No. 536,813
Int. Cl. H01h 47/32
U.S. Cl. 317—148.5                                  10 Claims

ABSTRACT OF THE DISCLOSURE

An electronic switching circuit coupled in series with a relay having a capacitor to store charge prior to the activation of the relay, said capacitor discharging into the relay upon application of a signal to the relay to insure the actuation thereof, the capacitor being charged in preparation for a subsequent activation of the relay after deactivation of the switching circuit.

---

This invention relates to solid state circuitry associated with the operation of electronic or electromechanical switching or control circuits. More particularly, this invention relates to solid state D.C. circuits designed to be actuated to improve the operation of an electrically controlled switching or control circuit during momentary periods of critical power demand and to be inactuated during noncritical periods.

Certain types of circuits experience voltage and current pulses during critical operating periods that would distort circuit performance. For example, a relay power supply circuit undergoes such a critical period upon actuation of the relay and the relay performance may be distorted beyond acceptable limits if the power supply circuit resistance is too high. As another example a motor power supply circuit undergoes such a critical period upon completing the power supply circuit to actuate the motor and also upon application of a momentary load increase on the motor, and the motor performance may be seriously distorted because of insufficient momentary current and voltage in the power supply circuit.

A primary object of this invention is to provide a switching circuit for control circuits of the above-described type that effectively adds to the current and voltage of the control circuit during critical operating periods. Another object is to provide such a circuit for a relay control circuit such that the relay control circuit resistance can be appreciably increased without causing unacceptably-distorted relay performance. A further object is to provide such a switching circuit that automatically senses a current surge and discharges a capacitance into the control circuit in response thereto. Still another object is to provide such switching circuit wherein the discharged capacitance is automatically recharged.

These and other objects and advantages will become apparent from the following description in conjunction with the accompanying drawings, of which:

FIG. 1 is an electrical schematic of the switching circuit of the invention;

FIG. 2 is an electrical schematic showing the FIG. 1 circuit in a D.C. relay control circuit;

FIG. 3 is an electrical schematic showing the FIG. 1 circuit in a D.C. motor control circuit; and FIGS. 4a–4d depict exemplary oscilloscope waveforms representing the states of relay current controlled by a circuit with (solid line) and without (broken line) the FIG. 1 circuit.

In general, the switching circuit of this invention is a D.C. circuit comprising semiconductor switching means responsive to current changes in an external circuit, a capacitance which is switched into and out of the extended circuit by the semiconductor switching means, and means for charging the capacitance. When a current pulse is detected by the semiconductor switching means, the charged capacitance is switched into the external circuit with polarity such that the discharge adds to the voltage and current in the external circuit during the critical period. When the capacitance has discharged, the current and voltage in the external circuit return to normal and the semiconductive switching means switches the capacitance out of the external circuit. Then the charging means recharges the capacitance. The FIG. 1 embodiment of the invention comprises semiconductive switching means in the form of two transistors, 10 and 12 of opposite type (N and P types being shown respectively) interconnected in a positive feedback relation; a capacitance 14; and a capacitance charging means 16.

The emitter of transistor 10 is connected to the input 18 of the circuit and the emitter of transistor 12 is connected to the negative end of the capacitance 14. The positive end of the capacitance 14 is connected to the output 20 of the circuit through a diode 26 and the base of transistor 10 is connected to the output 20 through a diode 30. A resistance 22 is connected between the input 18 and the output 20 to provide a high resistance leak to bypass the diode assembly 24–30 and to serve as a static drain. Diodes 24 and 26 have the same polarity and are connected in series with the input 18 and the output 20 to route the charge and discharge paths of capacitance 14 around transistor 10. Diodes 28 and 30 have the same polarity and are connected in series with the input 18 and the output 20. Diode 28 protects transistor 10 from excessive base current and diode 30 directs current flowing in an external circuit between the input 18 and the output 20 to transistor 10. A resistance 32 is connected between the base and emitter of transistor 10 in parallel with diode 28 to complete the base-to-emitter circuit of transistor 10 during low or zero current conditions.

The charging means 16 comprises a transistor 34 of the same type as transistor 10 with its emitter connected to the negative end of the capacitance 14 and its base connected to the base of transistor 12 and, through a resistance 38, to a second input 36 of opposite polarity to input 18. A resistance 40 and a diode 42 are connected in parallel between the base and emitter of transistor 34 and provide, with respect to transistor 12, the same function as diode 28 and resistance 32. A resistance 44 connects the collector of transistor 34 to the input 36 to limit the collector current of transistor 34 to a safe value.

The operation of the FIG. 1 circuit when applied to an external relay control circuit, such as in FIG. 2, is as follows: Contacts A close to initiate a control signal or pulse in loop B. Loop B connects to a line relay C. The relay is powered from power source D via the FIG. 1 circuit E. Current flowing in the closed loop B turns on transistor 10 (normally off) via diode 30 and transistor 10 turns on transistor 12 (normally off). Transistor 10 connects charged capacitor 14 in series with diodes 26 and 28, placing the capacitor in series with the control loop B and driving transistor 10 and thus 12 further into saturation. Capacitor 14 discharges thereby insuring adequate current and voltage for proper relay operation. Transistor 34 (normally off) is used to provide a fast charge path for the discharged capacitor 14 and is "on" only when transistors 10 and 12 are "off" and capacitor 14 is less than fully charged. When capacitor 14 approaches the maximum charge and voltage, transistor 34 turns "off" and the charge path is completed via resistors 38 and 40.

The advantages of employing the FIG. 1 circuit in the manner of FIG. 2 is shown by FIGS. 4a–d and following table. FIGS. 4a–d show curves illustrating the operating characteristics of a telephone type 400 ohm relay with the circuit of FIG. 1 (solid line) and without the circuit of FIG. 1 (broken line) when pulsed with 40 millisecond make and 60 millisecond break periods using a 50 volt D.C. power source and 0 ohm, 1200 ohm, 2000 ohm and 3000 ohm control loop resistances, respectively. A–C is operating interval using FIG. 1 circuit. B–D is operating interval without FIG. 1 circuit.

TABLE

| Relay operation | Fig. 4a (ms.) | Fig. 4b (ms.) | Fig. 4c (ms.) | Fig. 4d (ms.) |
|---|---|---|---|---|
| A operates | 7 | 8 | 9 | 10 |
| B operates | 9 | 15 | 24 | |
| C releases | 49 | 50 | 49 | 47 |
| D releases | 49 | 50 | 48 | |
| Operated period of relay: | | | | |
| A to C | 42 | 42 | 40 | 37 |
| B to D | 40 | 35 | 24 | |

FIG. 4a depicts a typical oscilloscope waveform representing the states of relay current in a short or low resistance control loop with and without the FIG. 1 circuit in the control line circuit. FIG. 4b shows the current in the same relay but using the normal maximum control loop resistance with and without the FIG. 1 circuit. It will be noticed that the relay operation is more representative of the originating pulse and that the relay operates more positively with the FIG. 1 circuit in the control line circuit.

FIG. 4c shows the current in the same delay when operating with a control loop resistance in excess of its design parameter with and without the FIG. 1 circuit. The relay operation is badly distorted without the FIG. 1 circuit but is still reliable and acceptable in performance with the FIG. 1 circuit in the control line circuit.

FIG. 4d shows the current in the same relay circuit when operating with the control line loop 2½ times the resistance of its design maximum. At this point the relay has failed completely without the FIG. 1 circuit in the control line circuit but is still performing acceptably with the FIG. 1 circuit in the control line circuit. It will have been seen that the net effect of the FIG. 1 circuit in this example of a telephone pulsing relay circuit application is to decrease distortion, increase the range or loop limit of the control circuit and in doing so to increase the versatility of the relay and thus permit a more economical, improved performance of the relay.

FIG. 3 illustrates application of the FIG. 1 circuit to a fractional horsepower direct current motor circuit. This will quadruple the starting torque developed by the motor. This application of the switching circuit will permit extremely fast starting of small control motors and permit heavier shaft loads to be set in motion. By selecting a critical value of resistance 22 it is possible to provide the motor with a temporary power increase whenever a momentary load results in an increase in current through resistance 22. This will develop sufficient voltage to trigger the switch with the immediate effect being the discharge of capacitor 14 in series with the motor circuit. This power can be provided repeatedly without stopping the motor as every time the load is reduced to the point where the decreased current develops less than the necessary sustaining voltage across resistance 22, the transistor switch will open permitting transistor 34 to recharge capacitor 14.

If the circuit of this invention is to be operated under controlled conditions, the FIG. 1 circuit can be modified by eliminating those components which function primarily as protective devices for the transistors. Thus, resistance 22, and diodes 24, 26 and 28 could be eliminated, the positive end of capacitance 14 being connected directly to the output 20. Also, if the fast charging capability of transistor 34 were not required, transistor 34, diode 42 and resistance 44 could be eliminated, the charging path for capacitance 14 being provided by resistances 38 and 40.

It is believed that the invention will have been clearly understood from the foregoing detailed description of the now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits. For example, by selecting transistor types ––P or N–– and component values applicable to a particular circuit, polarity, voltage and time can be provided for as required using the basic circuit of FIG. 1. Also, transistors 10 and 12 could be replaced by their electrical analogue, a PNPN silicon-controlled switch.

What is claimed is:

1. An electronic switching circuit having an input and an output for connection with an external control circuit comprising semiconductive switch means electrically connected with said input; a capacitance electrically connecting said semiconductive switch means and said output; and charging means electrically connected to said capacitance for charging said capacitance; said semiconductive switch means being actuated by current in said external control circuit to discharge said capacitance through said output and being deactuated after said discharge, and said charging means being actuated to charge said capacitance upon deactuation of said semiconductive switch means.

2. The circuit of claim 1 wherein said semiconductive switch means comprises a pair of transistors of opposite type interconnected in positive feedback relation, the emitter of one transistor being connected to said input and the emitter of the other transistor being connected to said capacitance.

3. The circuit of claim 1 wherein said charging means comprises a transistor.

4. The circuit of claim 1 wherein said semiconductive switch means comprises a pair of transistors of opposite type interconnected in positive feedback relation with the emitter of the first transistor being connected to said input and the emitter of the second transistor being connected to said capacitance; and wherein said charging means comprises a third transistor of the same type as said first transistor with its base being interconnected with the base of said second transistor and with its emitter being interconnected with said capacitance.

5. An electronic switching circuit having an input and an output for connection with an external control circuit comprising a pair of transistors of opposite type interconnected in positive feedback relation; a capacitance connected at one end to the emitter of the second transistor; first and second diode means connected in series between said input and output with the emitter of the first transistor being connected to said input and the base of said first transistor being connected to the junction between the first and second diode means; third and fourth diode means connected in series between said input and output with the other end of said capacitance being connected to the junction between the third and fourth diode means; a third transistor of the same type as said first transistor with its base interconnected with the base of said second transistor and its emitter interconnected with said one end of said capacitance.

6. An electronic relay control circuit comprising a relay, and a power supply circuit electrically connected to said relay having an input for electrical connection with a power supply and an output for electrical connection with said relay, semiconductive switch means electrically connected with said input, a capacitance electrically connecting said semiconductive switch means and said output, and charging means electrically connected to said capacitance for charging said capacitance, said semiconductive switch means being actuated by current in said power supply circuit to discharge said capacitance through said output when said relay is actuated and said semiconductive switch means being deactuated after said discharge, and said charging means being actuated to charge said capacitance upon deactuation of said semiconductive switch means.

7. The circuit of claim 6 wherein said semiconductive switch means comprises a pair of transistors of opposite type interconnected in positive feedback relation, the emitter of one transistor being connected to said input and the emitter of the other transistor being connected to said capacitance.

8. The circuit of claim 6 wherein said charging means comprises a transistor.

9. The circuit of claim 6 wherein said semiconductive switch means comprises a pair of transistors of opposite type interconnected in positive feedback relation with the emitter of the first transistor being connected to said input and the emitter of the second transistor being connected to said capacitance; and wherein said charging means comprises a third transistor of the same type as said first transistor with its base being interconnected with the base of said second transistor and with its emitter being interconnected with said capacitance.

10. An electronic relay control circuit comprising a relay, and a power supply circuit electrically connected to said relay having an input for electrical connection with a power supply and an output for electrical connection with said relay, a pair of transistors of opposite type interconnected in positive feedback relation, a capacitance connected at one end to the emitter of the second transistor, first and second diode means connected in series between said input and said output with the emitter of the first transistor being connected to said input and the base of said first transistor being connected to the junction between the first and second diode means, third and fourth diode means connected in series between said input and output with the other end of said capacitance being connected to the junction between the third and fourth diode means, a third transistor of the same type as said first transistor with its base interconnected with the base of said second transistor and its emitter interconnected with said one end of said capacitance.

References Cited

UNITED STATES PATENTS

| | | | |
|---|---|---|---|
| 3,140,428 | 7/1964 | Shepard | 317—151 X |
| 3,158,786 | 11/1964 | Hurtle | 317—148.5 X |

LEE T. HIX, *Primary Examiner.*

U.S. Cl. X.R.

307—131; 317—151, 154